(No Model.)
L. DE PLACE.
APPARATUS FOR TESTING METAL PIECES.
No. 445,860.  Patented Feb. 3, 1891.
FIG. I.
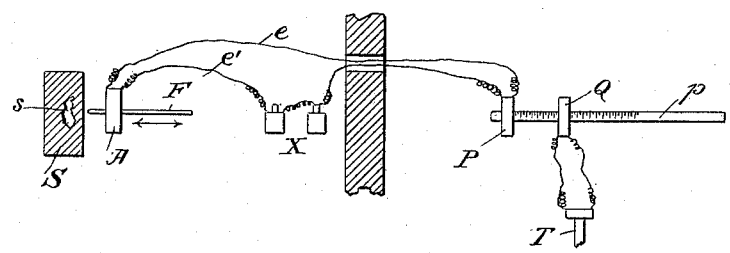
FIG. II.
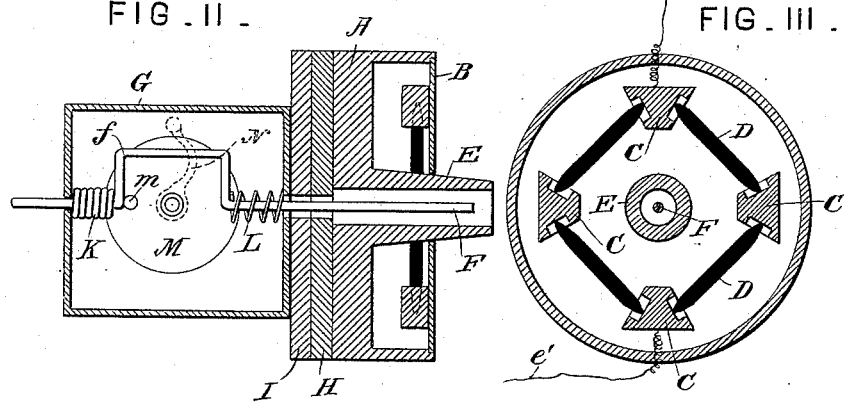
FIG. III.
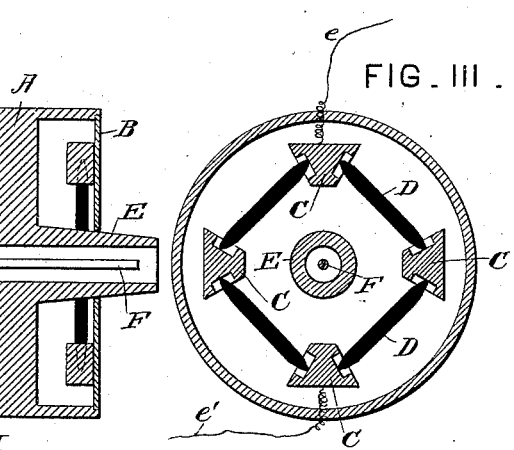
FIG. IV.
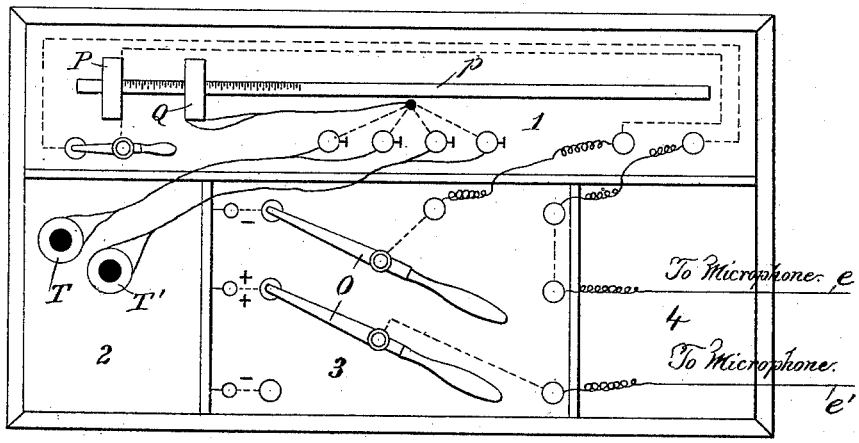
Attest:
Geo. T. Smallwood.
R. D. Hogue.
Inventor:
Louis di Place
by Pollard Mauro,
his attorneys.

UNITED STATES PATENT OFFICE.

LOUIS DE PLACE, OF ANGERS, FRANCE.

APPARATUS FOR TESTING METAL PIECES.

SPECIFICATION forming part of Letters Patent No. 445,860, dated February 3, 1891.

Application filed November 11, 1890. Serial No. 371,085. (No model.) Patented in France August 27, 1888, No. 192,619.

*To all whom it may concern:*

Be it known that I, LOUIS DE PLACE, a citizen of France, and a resident of Angers, (Maine-et-Loire,) in the Republic of France, have invented a new and useful Improvement in Apparatus for Discovering and Locating Defects in Metal Pieces, (for which I have obtained French Patent No. 192,619, dated August 27, 1888,) which is fully set forth in the following specification.

This invention has reference to the testing of pieces or castings of metal—such as projectiles, armor-plates, shaftings, &c.—for the purpose of detecting flaws, fissures, cavities, or other concealed or internal defects not apparent upon the surface of the object tested.

At present the mode of examining or testing such metallic objects is very crude and unsatisfactory. It consists of simply tapping the surface of the article with a hammer and listening to detect any variations in the sounds given out from different points. Many existing defects cannot be discovered in this way.

According to the present invention the existence of even slight defects is made evident audibly in a receiving telephone or telephones held at the ear of the operator through a simple arrangement of apparatus which I term a "schiseophone," as will now be described.

That part of the testing device which is applied to the metal piece consists of a telephone-transmitter or microphone and a striker or knocker for tapping the surface to be tested. The microphone is in circuit with a suitable battery and with a primary helix or coil of wire. The secondary helix is included in circuit with a receiver or receivers to be used in another apartment from that where the piece is being tested. In use the secondary helix is moved to such distance from the primary that no sound is heard in the receiver as the striker acts against the sound parts of the piece. Consequently as soon as a defective part comes under the striker the resonance will produce an audible tone in the receiver, even though the defect be slight. Any convenient means may be used for actuating the striker.

In the accompanying drawings, which form part of this specification, Figure I is a diagram illustrating the arrangement of the schiseophone and the electric circuits. Fig. II is a longitudinal section of the transmitter and striker; Fig. III, an interior view of the transmitter, and Fig. IV a plan view of the box in which the several parts of the schiseophone are arranged in a portable form.

Referring first to Figs. I and II, I will describe the form of microphone which I prefer to use and the manner of combining the same with a striker, premising, however, that other forms and arrangements may be substituted without departing from the spirit of the invention, as will be obvious to persons skilled in the art.

The microphone is composed of a box or casing A of any suitable material, as wood, supporting at one side a thin plate or board B of a non-conducting material, such as wood, centrally perforated.

To the inside of plate B are attached carbon blocks C, provided with recesses or sockets, in which are fitted carbon pencils D. These elements are connected by wires $e\ e'$ in the circuit of a suitable battery X, and, as is well understood, any variation in pressure of the carbon elements produces a corresponding variation in the current flowing through them from said battery.

Through the central perforation of plate B projects a sleeve E, in which works the reciprocating rod or striker F, which passes through a chamber of casing G. The latter is attached to the case of the microphone; but between them are preferably interposed two plates or washers H I, the former of lead and the latter india-rubber. Rod F has a bend or offset at $f$, and is surrounded by a coiled spring K, tending to push it so that its end will project from sleeve E. It is also provided with a weaker counter-spring L, causing it to rebound from any object it may strike, leaving the latter free to vibrate.

In box G is a disk M, having an eccentric pin or lug $m$, which when the disk is rotated, as by a crank N, (indicated in dotted lines,) will at each revolution push striker F to the left against the pressure of spring K. The end of sleeve E is intended in use to rest against the object tested, and its length relative to the position of the end of the striker F determines the force of the blow which the latter gives to such object.

The batteries are preferably arranged in two sets, and a switching-commutator is provided to charge the batteries, so as to avoid polarization by too long use. The commutator is shown at O, Fig. IV. The battery-circuit also includes a primary or inducing helix P, Figs. I and IV, fixed at the end of a graduated rod or scale $p$, graduated, say, from 0 to 40. On this rod is mounted a secondary helix Q, which is movable lengthwise of said rod, and this helix is included in circuit with the receiving-telephones T T', which are of any suitable kind adapted to be applied to the ears of the operator. The circuit-connections are clearly shown in Figs. I and IV. The resistance of coil P may conveniently be two hundred and fifty ohms, that of coil Q one hundred and twenty-five ohms, and that of the receivers T T' one hundred and twenty-five ohms each. The apparatus when not in use may be arranged in a box R, as shown in Fig. IV, the box having four compartments 1 2 3 4. In the first are the induction-coils and scale. The second contains the receivers, the third the batteries and commutator-switches, and the fourth the microphone and striker.

The operation of the apparatus is as follows: S, Fig. I, represents an article to be tested, there being a flaw or cavity at $s$. The testing device is moved by the operator over the surface of the article and the striker put in operation by turning the crank, (or by any other operating means.) A second operator in another apartment applies the receiving-telephones to his ears and first moves the secondary coil Q away from primary P until no sound is heard. So long as the body of the article beneath the striker is sound and without flaw no noise will be heard by the listening operator; but as soon as a defective portion comes under the striker a tone will be heard at the receiving-telephones.

Having now fully described my said invention, what I claim, and desire to secure by Letters Patent, is—

1. An instrument for testing metal objects, comprising, in combination, a microphone or telephone-transmitter in an electric circuit, including a coil or helix, a striker in close proximity to said microphone, a secondary coil or helix, and a telephone-receiver in circuit therewith, substantially as described.

2. The combination of the microphone, the striker, a primary coil in circuit with the microphone, a secondary coil adjustable with reference to the primary coil, and a receiver in circuit with the secondary coil, substantially as described.

3. The combination, with the receiving-telephone and induction-coil, of a microphone in circuit with the primary of said coil, a striker arranged in close proximity to the carbon elements of said microphone, and means, as indicated, for actuating said striker, substantially as described.

4. The combination of the microphone, the striker, a primary helix in circuit with the microphone and mounted on a graduated bar or scale, a secondary helix adjustable on said bar, and a receiver in circuit with the secondary helix, substantially as described.

5. A portable testing-instrument comprising a box or case having several compartments, a microphone and striker, batteries in circuit with the microphone, a receiver or receivers, a scale or graduated bar with a fixed and a movable helix in circuit, respectively, with the microphone and receiver or receivers, and switches and circuit-connections, all arranged in the compartments of said box, substantially as described.

In testimony whereof I have signed this specification in the presence of two subscribing witnesses.

LOUIS DE PLACE.

Witnesses:
 ROBT. M. HOOPER,
 GEORGE R. OSTHEIMER.